(12) United States Patent
Takata et al.

(10) Patent No.: US 7,436,415 B2
(45) Date of Patent: Oct. 14, 2008

(54) DISPLAY SYSTEM AND DISPLAY PANEL AND SIGNAL PROCESSING APPARATUS FOR USE WITH DISPLAY SYSTEM

(75) Inventors: Haruki Takata, Yokohama (JP); Hiroshi Aoki, Yokohama (JP); Ryo Hasegawa, Yokohama (JP); Fumio Sogabe, Fujisawa (JP); Misako Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 10/894,117

(22) Filed: Jul. 20, 2004

(65) Prior Publication Data

US 2005/0057487 A1 Mar. 17, 2005

(30) Foreign Application Priority Data

Sep. 11, 2003 (JP) ............................. 2003-319221

(51) Int. Cl.
*G06F 3/038* (2006.01)
*G09G 5/10* (2006.01)

(52) U.S. Cl. ...................................... 345/690; 345/102
(58) Field of Classification Search ................. 345/102, 345/204, 690; 725/38, 141
See application file for complete search history.

(56) References Cited

U.S. PATENT DOCUMENTS

| | | | | |
|---|---|---|---|---|
| 5,546,098 A * | 8/1996 | Moriconi | .................... | 345/3.1 |
| 6,075,574 A * | 6/2000 | Callway | .................... | 348/673 |
| 6,795,053 B1 * | 9/2004 | Funamoto et al. | ........... | 345/102 |
| 6,823,088 B2 * | 11/2004 | Kaneko et al. | .............. | 382/266 |
| 6,853,387 B2 * | 2/2005 | Evanicky et al. | ............ | 345/690 |
| 6,914,586 B2 * | 7/2005 | Burkhardt | .................... | 345/87 |
| 7,057,667 B1 * | 6/2006 | Mori et al. | ................... | 348/554 |
| 7,098,886 B2 * | 8/2006 | La | ............................... | 345/99 |
| 2002/0085123 A1 * | 7/2002 | Ono | ........................... | 348/584 |

(Continued)

FOREIGN PATENT DOCUMENTS

EP          1 032 201          8/2000

(Continued)

OTHER PUBLICATIONS

Japanese Office Action dated Jun. 12, 2007, in connection with JP Patent Appln. No. 2003-319221.

*Primary Examiner*—Amr Awad
*Assistant Examiner*—Randal Willis
(74) *Attorney, Agent, or Firm*—Antonelli, Terry, Stout & Kraus, LLP.

(57) ABSTRACT

The present invention provides a technology for using an STB in conjunction with various display panels that comprise different types of display devices. The present invention comprises a display panel (2), which includes a memory section (255) and a transmitter section (210). The memory section (255) stores identification information (ID information), which includes the information about the type of a device constituting the display panel (2) and/or the specifications for the display panel. The transmitter section (210) transmits the ID information stored in the memory section (255) to a signal processing apparatus (1). The signal processing apparatus (1) includes a control circuit (110), which receives the ID information transmitted from the display panel (2), determines the device type of the display panel and/or the specifications for the display panel from the received ID information, and exercises control in accordance with the determination result to change the operation of the signal processing apparatus.

13 Claims, 9 Drawing Sheets

U.S. PATENT DOCUMENTS

| | | | |
|---|---|---|---|
| 2002/0093498 A1* | 7/2002 | Park | 345/204 |
| 2003/0011738 A1 | 1/2003 | Akiyama et al. | |
| 2003/0117382 A1* | 6/2003 | Pawlowski et al. | 345/204 |
| 2003/0169245 A1* | 9/2003 | Tamura | 345/204 |
| 2003/0206242 A1* | 11/2003 | Choi | 348/441 |
| 2004/0066382 A1* | 4/2004 | Aoki | 345/204 |
| 2005/0270265 A1* | 12/2005 | Plut | 345/102 |
| 2006/0041695 A1* | 2/2006 | Lee | 710/64 |
| 2006/0055829 A1* | 3/2006 | De Haan | 348/675 |

FOREIGN PATENT DOCUMENTS

| | | |
|---|---|---|
| EP | 1 215 897 | 6/2002 |
| JP | 05-094277 | 4/1993 |
| JP | 5-297982 | 11/1993 |
| JP | 2000-250503 | 9/2000 |
| JP | 2003-043988 | 2/2003 |

* cited by examiner

ID INFORMATION

| ITEM NUMBER | ID INFORMATION | |
|---|---|---|
| 1 | DISPLAY DEVICE TYPE | · CATEGORY (LCD/PDP/FED)<br>· INCH SIZE |
| 2 | DISPLAY FORMAT | · PIXEL COUNT<br>· REFRESH FREQUENCY<br>· SCANNING METHOD |
| 3 | MODEL NUMBER | |
| 4 | MANUFACTURER NAME | |

TYPICAL DATA STRUCTURE

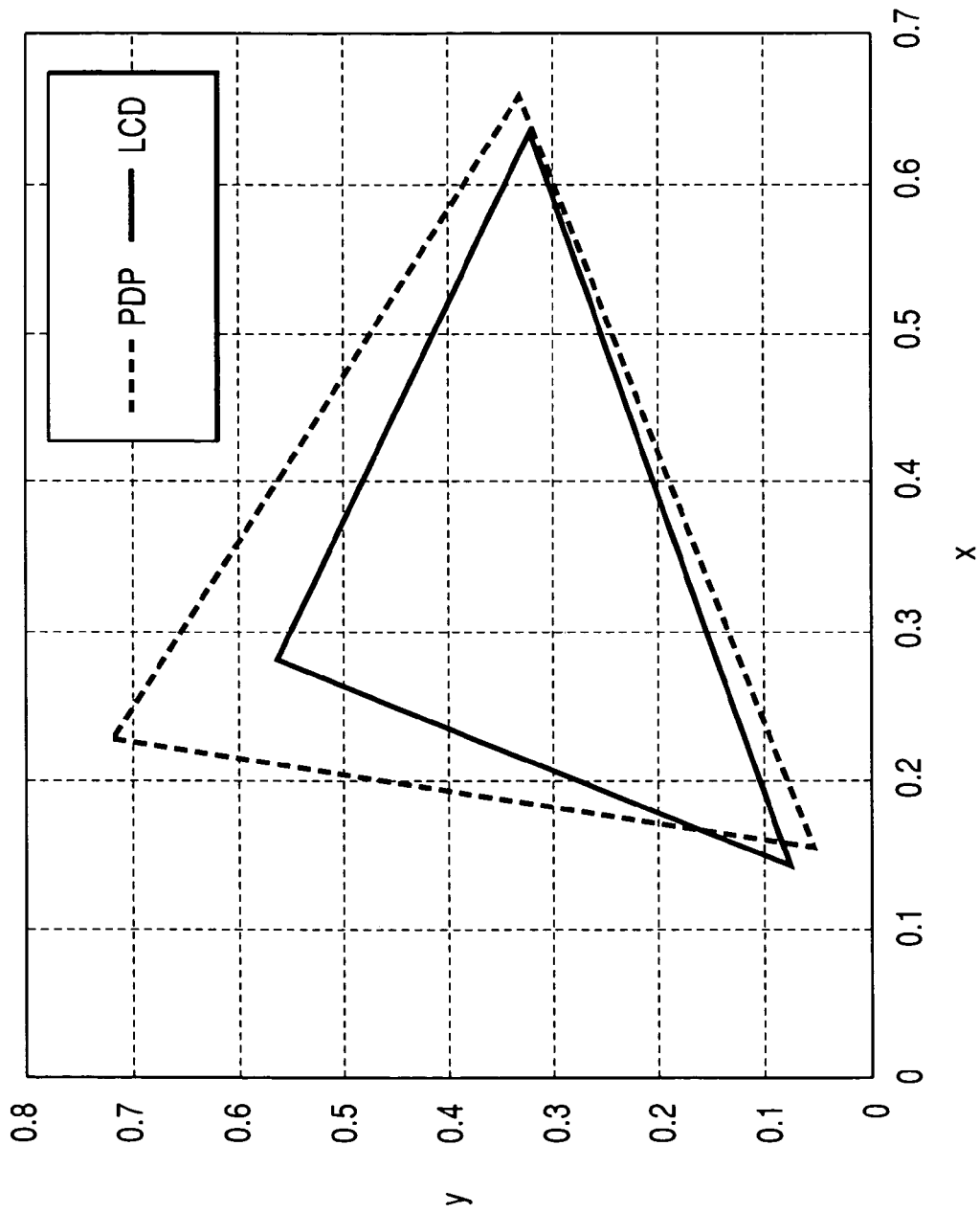

ITEM SELECTION SCREEN FOR LCD VIDEO SETUP

ITEM SELECTION SCREEN FOR PDP VIDEO SETUP

DISPLAY SYSTEM AND DISPLAY PANEL AND SIGNAL PROCESSING APPARATUS FOR USE WITH DISPLAY SYSTEM

CLAIM OF PRIORITY

The present application claims priority from Japanese application serial no. P2003-319221, filed on Sep. 11, 2003, the content of which is hereby incorporated by reference into this application.

BACKGROUND OF THE INVENTION

The present invention relates to a display system in which a display panel for displaying an image and a signal processing apparatus for performing a video process on a video signal are interconnected for use, and a display panel and a signal processing apparatus for use with such a display system. More particularly, the present invention relates to a display system that uses a signal processing apparatus for display panels that differ in display device type and specifications, and display panels and signal processing apparatus for use with such a display system.

At present, a display system is composed by interconnecting a display device and a signal processing apparatus. As the display device, an LCD panel, a plasma display panel (hereinafter referred to as a PDP), or other flat display panel is used. The signal processing apparatus (hereinafter may be referred to as a set-top box (STB)), which is separate from the display panel, includes a tuner for receiving an analog/digital television signal and the like. This type of display system is shown, for instance, in FIG. 17 of Japanese Patent Laid-open No. 2003-43988.

SUMMARY OF THE INVENTION

The configuration described above is advantageous for a decrease in the display panel thickness and an increase in the elasticity and flexibility of display system installation site selection. However, the conventional technology described above uses a PDP as a display panel, and the STB connected to the PDP is designed for exclusive use with the PDP. Therefore, the STB cannot be used by connecting it to an LCD-based display panel. In other words, the above conventional technology does not permit the STB to be used with a LCD panel or other display device different from a PDP (the above conventional technology does not provide the STB with compatibility).

The LCD panel is equipped with a backlight. Its contrast may be improved by controlling the backlight illuminance with reference to the average luminance per video signal frame. The LCD panel and PDP differ, for instance, in color reproduction range, luminance characteristic, and gamma characteristic. Therefore, the STB for use with a specific display panel performs, for instance, a color correction process, contrast correction process, and gamma correction process in accordance with the characteristics of a display device employed for the display panel. Therefore, satisfactory operations will not be performed if the STB dedicated to an LCD is used with a PDP-based display panel. This also holds true if the STB dedicated to a PDP is used with an LCD-based display panel. Therefore, if the user purchases a display system with an STB that employs an LCD-based display panel, and later wishes to use a PDP-based display panel, the user has to purchase another display system with an STB that employs a PDP-based display panel. In this manner, a significant economic burden is imposed on the user.

Various STBs may exist, including an STB that receives only an analog television broadcast based on the standard NTSC signal or the like, an STB that is capable of receiving a digital BS/CS broadcast and digital terrestrial broadcast as well as an analog television broadcast, and an STB that can receive an analog/digital television broadcast and incorporates a hard disk drive or digital video player/recorder (so-called DVD player/recorder) for recording a television broadcast. When there are various types of STBs as described above, the above conventional technology does not make it possible to use one of a plurality of different STBs in conjunction with one of a plurality of display panels based on different display device types. It means that the user cannot choose from a wide variety of display system products.

Even when the selectable display panels employ the same display device type, their display format may vary from one display panel to another (i.e., their display specifications may differ from each other) Some PDPs use a 768 (vertical line count)×1280 (horizontal dot count), noninterlaced display format that supports a wide XGA type signal, and others use a 1024×1024 interlaced display format that supports a high-definition broadcast. If, for instance, a PDP having a 768×1280 display format is employed during the use of the conventional technology, a dedicated STB is connected and used to output a 768×1280 video signal at the maximum. However, this STB cannot be connected to a PDP having a 1024×1024 interlaced display format. Even if it is connectable, it cannot perform a satisfactory operation or display images by making effective use of the 1024×1024 interlaced display format.

Under the above circumstances, it is necessary to provide increased user friendliness by permitting the STB to be commonly connected and used in conjunction with various display panels, which differ in display device type or display format. In other words, it is important that the STB or display panel offer compatibility, thereby permitting the user to freely vary the STB/display panel combination and choose from a wide variety of display system products.

The present invention has been made in view of the above circumstances and discloses a technology for providing increased user friendliness by making it possible to freely vary the display panel/STB combination in a situation where the display device type employed for the display panel varies.

To achieve the above object, the present invention connects a display panel and a signal processing apparatus in such a manner that they are detachable. Further, at least the signal processing apparatus is capable of operating in accordance with the type of a device that constitutes the display panel. More specifically, the display panel is provided with a memory section and a transmitter section. The memory section stores identification information (ID information), including the information about the type of a device constituting the display panel and/or the specifications for the display panel. The transmitter section transmits the ID information stored in the memory section to the signal processing apparatus. The signal processing apparatus is provided with a control circuit, which receives an ID information transmitted from the display panel, identifies the display panel device type and/or display panel specifications in accordance with the received ID information, and controls the operation of the signal processing apparatus in accordance with the identification result.

The control circuit is capable of controlling the illuminance of an LCD panel backlight on the basis of the video signal-luminance (e.g., average luminance per video signal frame). If the received ID information indicates that the connected display panel is an LCD panel, the control circuit exercises illuminance control of the backlight. If, on the other hand, the received ID information indicates that the connected display panel is a PDP, the control circuit does not exercise illuminance control of the backlight. It is preferred that the color correction process and gamma correction process be changed in accordance with the indication given by the ID information. The ID information may contain the information about the horizontal pixel count and vertical line count of the display panel as the information about the display panel specifications so as to change the input video signal horizontal dot count, vertical line count, and other format-related elements in accordance with the display panel specifications (format), which is determined from the ID information.

Further, the display panel may display a menu screen that allows the user to set the backlight's reference illuminance. If an LCD panel is connected as the display panel while the configuration described above is employed, the display panel may display a menu screen for the purpose of allowing the user to perform the above setup. If a PDP is recognized as the connected display panel, on the other hand, the display panel may display a menu screen that does not permit the user to perform the above setup.

When the above configuration according to the present invention is employed, it is possible to commonly use the STB in conjunction with an LCD panel, a PDP, or a display panel based on some other device (e.g., field emission display (hereinafter abbreviated to FED). More specifically, the STB for an LCD panel can be used as the STB for a PDP. Further, the STB for a PDP can be used as the STB for an LCD panel.

The above configuration makes it possible to use the STB in conjunction with a display panel based on any device type. As a result, the present invention provides increased user friendliness.

BRIEF DESCRIPTION OF THE DRAWINGS

FIG. 6 presents xy chromaticity diagrams of an LCD panel and PDP.

DETAILED DESCRIPTION OF THE PREFERRED EMBODIMENT

Figure 1:
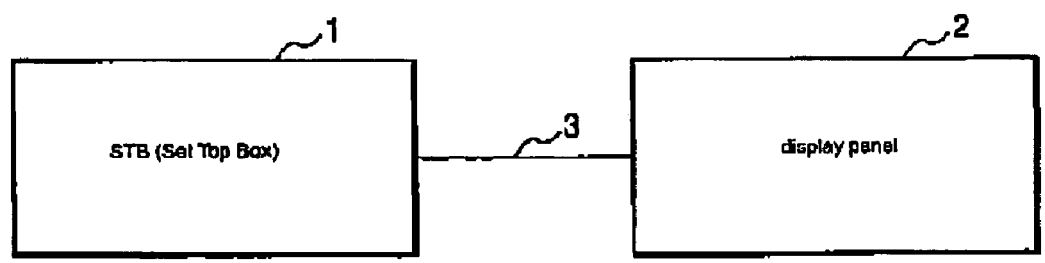
FIG. 1 is a general drawing of a display system according to the present invention.

A preferred embodiment of the present invention will now be described with reference to the accompanying drawings. FIG. 1 is a general drawing of a display system according to the present invention. A video signal processing apparatus (STB) 1 is connected to a display panel 2 via a cable 3. The STB 1 and display panel 2 respectively have their own independent housings, which are separate from each other. It goes without saying that the STB may be housed inside the display panel in such a manner that the STB is detachable.

The STB 1 includes a tuner section that receives a television broadcast signal. It is capable of receiving a standard NTSC or other analog terrestrial broadcast signal, analog BS broadcast signal, digital BS/CS broadcast signal, digital terrestrial broadcast signal, a combination of these signals, or all these signals. The STB 1 may incorporate a hard disk drive (HDD) or digital video player/recorder (so-called DVD player/recorder) for recording such broadcast signals. Further, the STB 1 may be provided with an input and output for a video signal and component signal.

On the other hand, the display panel 2 comprises an LCD panel, PDP, FED, or the like. One of such panels is connectable to the STB 1. It is assumed in the following description that either an LCD panel or PDP is used as the display panel 2.

The cable 3 contains at least a video line and audio line for transferring an analog or digital video signal and audio signal from the STB 1 to the display panel 2 and a bidirectional communication line for transmitting a control signal from the STB 1 to the display panel 2 and transmitting identification information (ID information) and a remote control signal, which is received by the display panel, from the display panel 2 to the STB 1. The relationship between the STB 1 and display panel 2 is such that the STB 1 is a master, which controls the display panel 2, and that the display panel 2 is a slave, which is controlled by the STB 1.

The present embodiment uses the cable 3 as a communication line that is based on a well-known RS232C communication method. The information exchanged via the communication line comprises, for instance, a 2-byte command and variable-length data, which follows the 2-byte command. The four high-order bits of the command's first byte indicate the type of the command. For example, "0001" represents a response command (display panel->STB); "0010", a query command (STB->display panel); and "0011", a setup command (STB->display panel). The four low-order bits indicate the data length in bytes. The second byte, which follows the first byte, is used to transmit an actual command. The communication method is not limited to the RS232C method. For example, it goes without saying that a three-line bus, which entails a data signal, clock signal, and enable signal, may also be used as the communication method.

Figure 2:
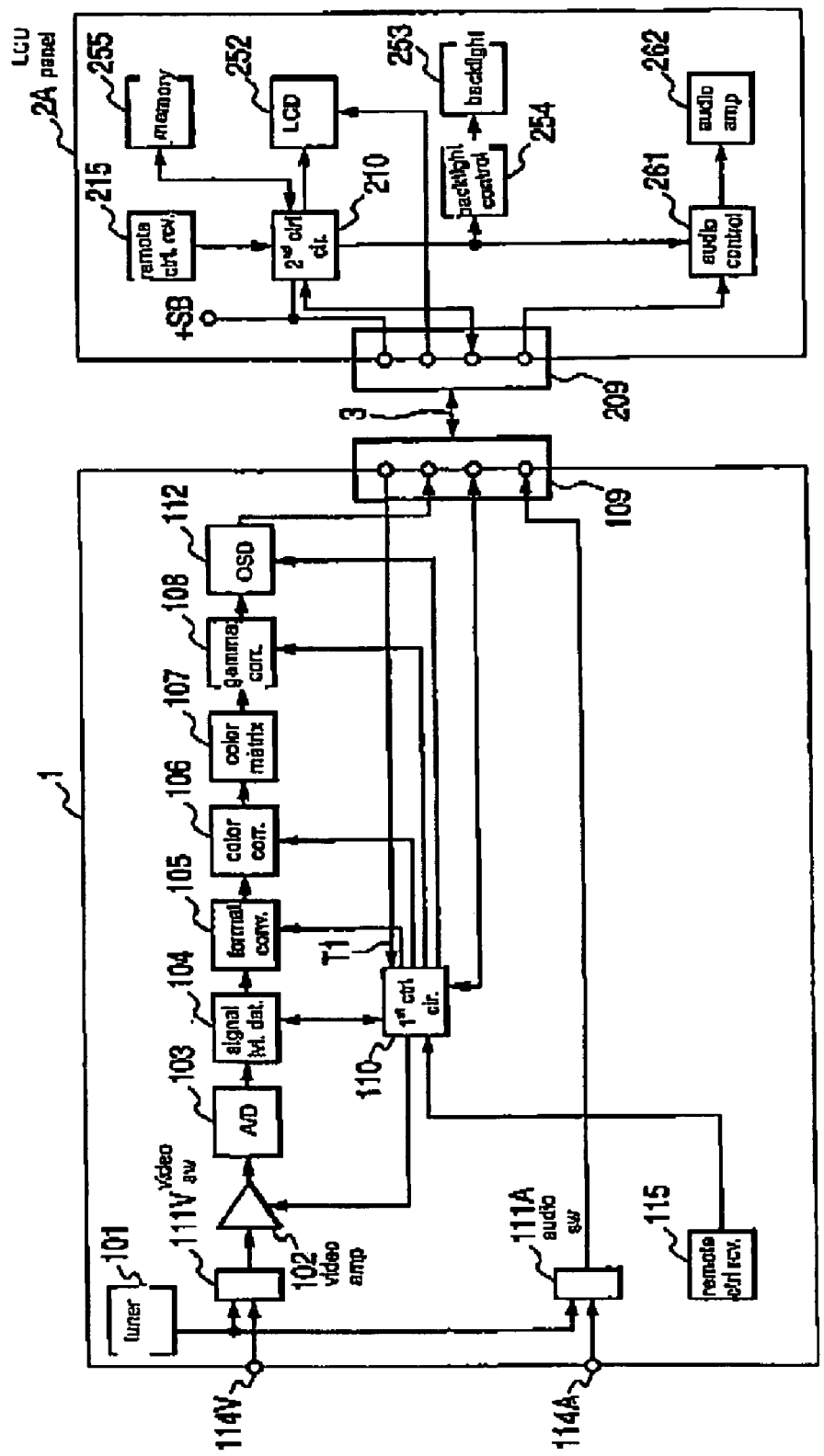
FIG. 2 is a detailed drawing illustrating the configuration of a display system according to the present invention, which comprises an STB and display panel.
Figure 3:
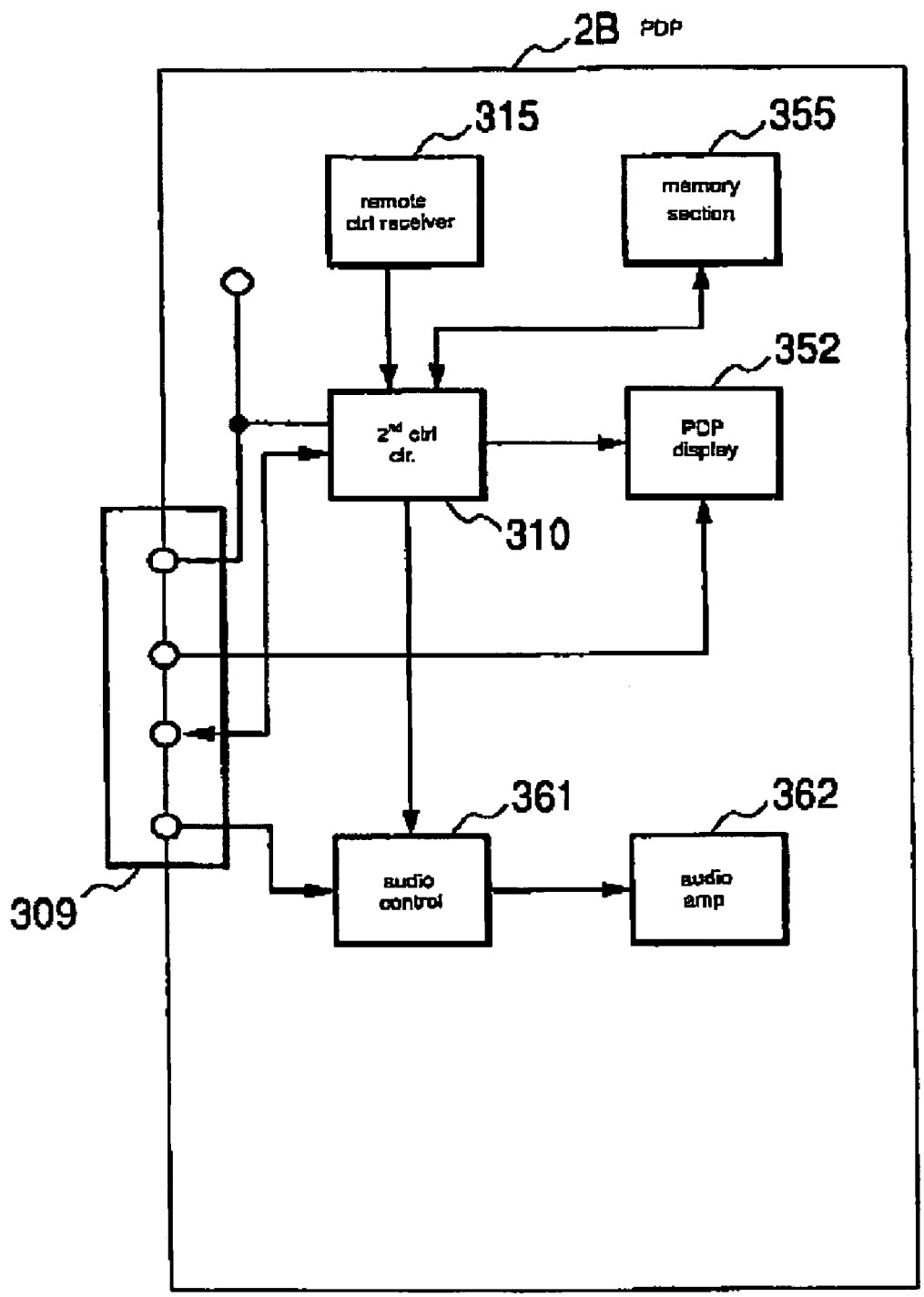
FIG. 3 illustrates a PDP, which is an example of the display panel to be connected to the STB.

FIGS. 2 and 3 illustrate in detail the configurations of the STB and display panel. The configurations and operations of the components will now be described in detail. First of all, the STB 1 will be described in detail. In FIG. 2, an LCD panel 2A is connected as the display panel. If a PDP is connected as the display panel, it is assumed for description purposes that a PDP 2B, which is shown in FIG. 3, is connected to the STB 1. However, if it is not necessary to differentiate between the LCD panel and PDP, the expression "display panel 2" is used.

A tuner 101 comprises an analog tuner section (not shown), which receives the above-mentioned analog television broadcast signal, a digital tuner section, which receives a digital television broadcast signal, and a digital unit (not shown), which includes a decoder. The digital television broadcast signal is compressed/encoded herein by an MPEG2 or like method. Therefore, the digital tuner section of the tuner 101 uses the decoder to decode the received digital television broadcast signal and outputs an analog video signal. The analog video signal output from the tuner 101 (it is assumed herein that the digital unit and analog tuner section both output an analog video signal) enters a switch 111, which alternates between an external input signal, which is entered from an external input terminal 114, and a tuner output. A selection output from a video switch 111V of the switch 111 enters a video amplifier 102. A selection output from an audio switch 111A of the switch 111 is directly connected to a first connector 109 and transferred out. The video amplifier 102 amplifies the entered video signal (amplifies the luminance signal among others). The gain of the video amplifier is regulated by a control signal that is fed from a first control circuit 110, which is composed by a microcomputer and provided with arithmetic and control functions. The amplitude of the luminance signal is amplified in accordance with the gain. The video amplifier 102 operates as a so-called contrast control section. The description of the present embodiment assumes that the video amplifier 102 is an analog amplifier for amplifying an analog video signal. However, if a digital video signal is entered from the tuner 101 or external input, a digital amplifier may be used. If a digital amplifier is used, its installation position is not limited to a place described above. It may be installed at any subsequent place, for instance, within the display panel 2.

The signal output from the video amplifier 102 enters an A/D converter (analog-to-digital converter) 103, which converts the entered signal to its digital equivalent. The digital video signal output from the A/D converter 103 enters a signal level detection circuit 104. The signal level detection circuit 104 detects, for instance, the average luminance per video signal frame (hereinafter referred to as the APL), the maximum value of video signal luminance per frame (hereinafter abbreviated to MAX), and the minimum value of video signal luminance per frame (hereinafter abbreviated to MIN), and then supplies the detection result to the first control circuit 110. The first control circuit 110 outputs a control signal for controlling the gain of the video amplifier 102 in accordance with the detected APL, MAX, and MIN. The output from the signal level detection circuit 104 enters a format conversion circuit 105. The format conversion circuit 105 converts the format of the entered video signal so that its horizontal pixel count and vertical line count comply with the specifications for the display panel. The video signal converted in this manner is then supplied to a color correction process circuit 106. The color correction process circuit 106 performs a color correction process on the digital video signal as appropriate for the display panel in accordance with various color correction settings contained in the control signal from the first control circuit 110. If, for instance, the display panel 2 is a PDP 2B, the color correction process circuit 106 performs a process on a digital video signal representing a green color until it is approximate to blue green (the details will be given later). The signal from the color correction process circuit 106 is converted by a color matrix circuit 107 to R, G, and B signals, and supplied to a gamma correction circuit 108 in which a predetermined gamma correction process is performed. The gamma correction circuit 108 has at least one gamma characteristic. In the present embodiment, the gamma correction circuit 108 has two different gamma characteristics, which correspond to an LCD panel and PDP, respectively. The control signal from the first control circuit 110 selects either of the two gamma characteristics in accordance with the display device employed for the display panel. A gamma correction process is then performed in accordance with the selected gamma characteristic. In an OSD (on-screen display) circuit 112, a predetermined OSD signal, which is a graphic signal for displaying information on the display panel, is superposed over the output from the gamma correction circuit 108. The resulting signal is then supplied to the display panel 2 via the cable 3 and the first connector 109, to which the cable 3 is connected in such a manner that the cable is disconnectable and reconnectable. Although it is assumed herein that the video signal to be supplied to the display panel 2 is in digital form, an analog video signal may alternatively be supplied to the display panel 2 via a D/A converter (digital-to-analog converter), which is not shown. The gamma correction circuit 108 may alternatively be positioned in the display panel 2. Further, the OSD circuit may alternatively be positioned in the display panel 2. If the OSD circuit is positioned in the display panel, the OSD information is transmitted from the STB 1 to the display panel 2 via the communication line within the cable 3 and used for superposition in the OSD circuit within the display panel 2.

The first control circuit 110 also provides gain control of the video amplifier 102 and controls various other circuits such as the signal level detection circuit 104, format conversion circuit 105, color correction process circuit 106, gamma correction circuit 108, and OSD circuit 112. Further, the first control circuit 110 uses the communication line within the cable 3 to transmit a control command for controlling the display panel 2 and receive, for instance, a remote control signal that is received by the display panel 2 and transmitted to the STB 1, which is a control center, and ID information for display panel type identification. It goes without saying that the first control circuit 110 is provided, for instance, with a memory (not shown) for storing ID information, OSD information and the like, a working memory (not shown) for arithmetic and control functions, and a ROM (not shown) for storing a program that performs a predetermined process.

The first control circuit 110 described above includes a control section for controlling various sections of the STB 1 and display panel 2 and a communication section for communicating with the display panel. For reduction of arithmetic and control functions, however, the first control circuit 110 may be configured so that the control section and communication section are separate from each other.

The first control circuit 110 determines the display panel's device type, display format, and other display specifications in accordance with the ID information received from the display panel 2. In accordance with the display specification determination result, the first control circuit 110 controls the format conversion circuit 105, color correction process circuit 106, gamma correction circuit 108, and OSD circuit 112. If an LCD panel 2A is employed as the display panel 2, for example, the first control circuit 110 also provides backlight illuminance control (detailed later) of the LCD panel. The control operation performed according to the ID information will be described in detail later.

The STB 1 has a remote control receiver apparatus 115, which receives a remote control signal from a remote control unit (not shown) that exercises remote control. The remote control signal received by the remote control receiver apparatus 115 enters the first control circuit 110. The first control circuit 110 performs a predefined operation in accordance with the remote control signal. If such an operation needs to be performed on the display panel side, the associated operation instruction is issued to the display panel via the communication line within the cable 3. If an operating control key (not shown) on the STB 1 is operated so that the associated key process needs to be performed on the display panel side, the associated operation instruction is issued via the communication line within the cable 3. The display panel also has a remote control receiver apparatus. When a remote control operation signal is received by the display panel, the received remote control signal is transmitted to the first control circuit 110 of the STB 1 via the communication line within the cable 3 and subjected to a predetermined process. The display panel also has an operating control key (not shown). When the operating control key is operated, the associated operating control key information is transmitted to the first control circuit 110 of the STB 1 via the communication line within the cable 3 as is the case with remote control.

The display panel 2 will now be described in detail. FIG. 2 indicates that an LCD panel 2A is used as the display panel 2. In reality, however, the LCD panel 2A, PDP 2B, or FED (not shown) is connected to the STB1 for use. The LCD panel 2A comprises the cable 3; a second connector 209, which is connected in such a manner that it disconnectable and reconnectable; an LCD section 252, which forms an image in accordance with a digital video signal that is supplied from the STB 1 via the cable 3 and the second connector 209; a backlight 253, which emits light from the rear of the LCD section 252; a backlight control circuit 254, which controls the backlight 253; a second control circuit 210, which is composed, for instance, of a microcomputer to perform arithmetic and control functions and provided with a function for establishing bidirectional communication with the first control circuit 110 of the STB 1 via the cable 3, a function for exercising overall control over the LCD panel 2A, and a function for providing illuminance control (illuminance correction) of the backlight via the backlight control circuit 254; a memory section 255, which stores ID information and other information beforehand; and a remote control receiver apparatus 215. It is preferred that the memory section 255 comprise a nonvolatile memory or battery-backed memory. It goes without saying that the memory section 255 is used as a memory for storing necessary information in addition to ID information.

Figure 4:
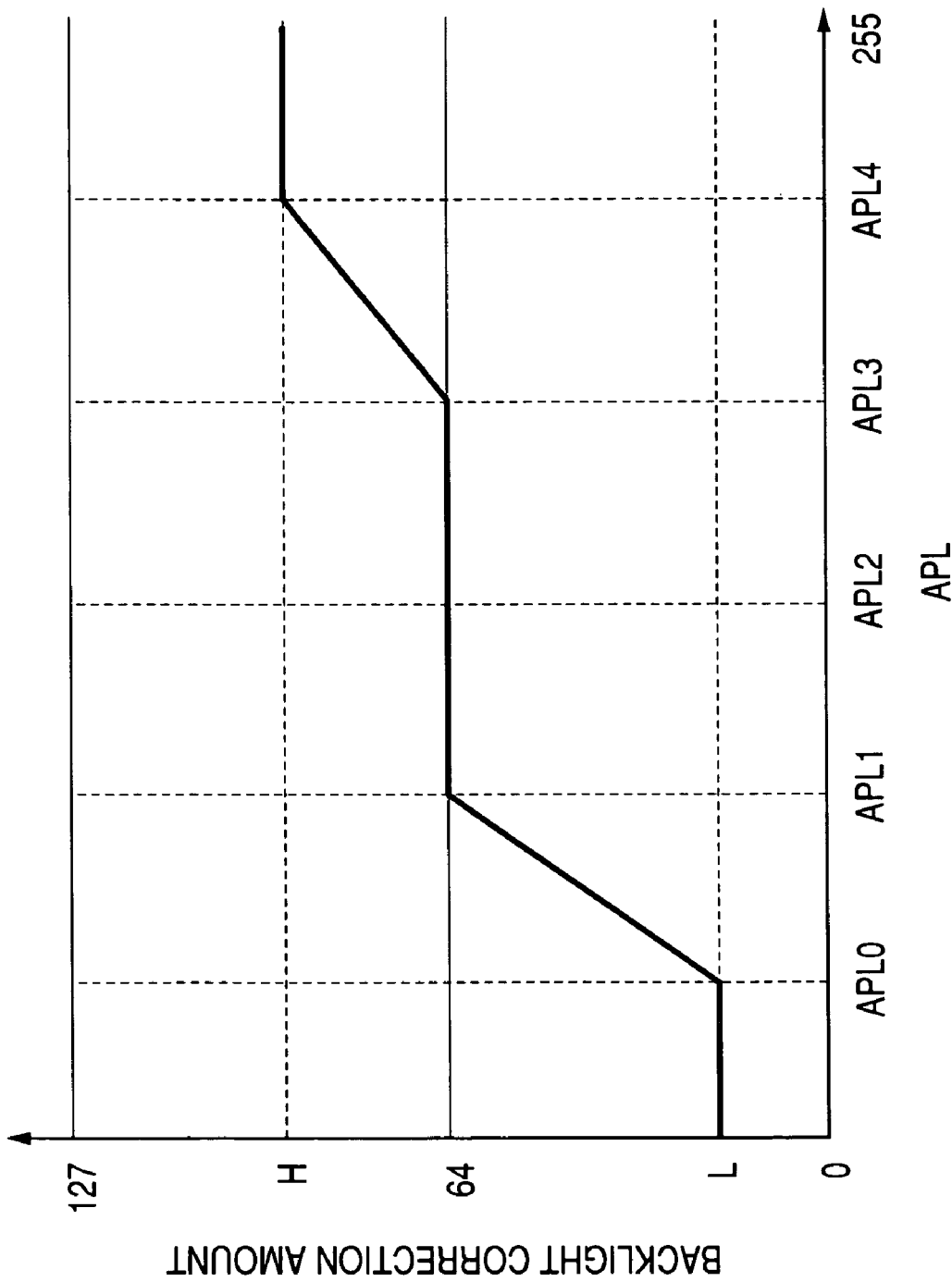
FIG. 4 shows the backlight control characteristic curve of a second control circuit for an LCD panel.

The STB 1 according to the present embodiment has a function for controlling the backlight illuminance of the LCD panel. The first control circuit 110 generates a correction control signal in accordance with APL information that is detected by the signal level detection circuit 104 as described earlier, and transmits the generated signal to the second control circuit 210 of the LCD panel 2A via the communication line within the cable 3. In accordance with the received correction control signal, the second control circuit 210 generates an interpolation correction control signal, which performs an interpolation process and the like to provide moderate control. The generated interpolation correction control signal is supplied to the backlight control circuit 254. In compliance with the interpolation correction control signal, the backlight control circuit 254 exercises APL-based illuminance control (illuminance correction) of the backlight 253. FIG. 4 shows a control characteristic curve of the second control circuit 210. In FIG. 4, the APL value is plotted along the horizontal axis. It is assumed that the APL value is expressed, for instance, with 8 bits (0 to 255). The backlight correction amount is plotted along the vertical axis. The vertical axis indicates the value of the interpolation correction control signal to be actually supplied to the backlight control circuit 254. It is assumed that the interpolation correction control signal value is expressed, for instance, with 7 bits (0 to 127). The second control circuit 210 controls the backlight illuminance in such a manner that when the detected APL value is within the range from APL0 to APL1, the prevailing illuminance is lower than the illuminance prevailing when the APL value is intermediate (that is, the APL value is within the range from APL1 to APL3). In other words, the associated backlight correction amount is smaller than the correction amount for the reference intermediate APL value (a correction amount value of 64, which provides no illuminance correction). If the detected APL value is within the range from APL3 to 255 (maximum), the illuminance of the backlight 253 is controlled so that the prevailing illuminance is higher than when the above intermediate APL value exists. In other words, the associated backlight correction amount is greater than the correction amount for the reference intermediate APL value. The backlight control signal having such a correction amount is transferred out to the backlight control circuit 254 to control the backlight 253. As a result, the amount of light incident on the LCD section 252, that is, the illuminance, is controlled.

When the APL is low, that is, the screen is dark overall, the backlight illuminance decreases. Therefore, the amount of backlight leakage from the front of the LCD panel can be reduced. As a result, it is possible to inhibit a dark image from becoming whitish (inhibit a black color from being impaired). When the APL is high, on the other hand, that is, the screen is bright overall, the backlight illuminance increases. Therefore, a bright image can be displayed so as to produce a better look.

The LCD panel 2A has the memory section 255, which stores ID information. In compliance with an ID information request that is issued when the first control circuit 110 of the STB 1 verifies the display panel connection, the ID information that is previously stored in the memory section 255 is read and transmitted from the second control circuit 210 to the first control circuit 110 of the STB 1 via the communication line within the cable 3. The second control circuit 210 constitutes a transmitter section that transmits the ID information stored in the memory section 255 to the STB 1. An example of display panel connection verification is described below.

The LCD panel 2A has a standby power supply +SB, which is formed when a power cord (not shown) is connected to a power source. The standby power supply +SB supplies power to the second control circuit 210 and is connected to one terminal of the second connector 209. This terminal is connected to a panel connection verification input terminal T1 of the first control circuit 110 via the cable 3 and the first connector 109 of the STB 1. Therefore, when the cable 3 is connected between the first connector 109 of the STB 1 and the second connector 209 of the LCD panel 2A and the LCD panel power cord is connected to a power source, the first control circuit 110 of the STB 1 can check the voltage developed at the panel connection verification input terminal T1 to verify that the LCD panel 2A is connected. After the display panel connection is verified in this manner, the first control circuit 110 of the STB 1 requests the LCD panel 2A via the communication line within the cable 3 to transmit ID information.

Upon receipt of the above ID information request, the second control circuit 210 of the LCD panel 2A reads ID information from the memory section 255 and transmits it to the STB 1 via the cable 3.

When an audio signal enters the LCD panel 2A via the first connector 109 of the STB 1, the cable 3, and the second connector 209, it is forwarded to an audio control circuit 261, subjected to bass adjustment (BASS), treble adjustment (TREBLE), balance adjustment (BALANCE), and surround adjustment (SURROUND), amplified by an audio amplifier 262, and output from a speaker (not shown) as a sound. The PDP 2B is basically the same as the LCD panel 2A except that the former has a PDP display section 352 instead of the LCD section and is without a backlight. Elements having the same functionality are assigned the same reference numerals (except that the highest-order digit is changed from 2 to 3). Of course, the PDP display section 352 differs from the LCD section in display section drive method and the like. However, such differences are irrelevant to the present invention. Therefore, the configuration of a display section drive is not described herein.

Figures 5A, 5B:
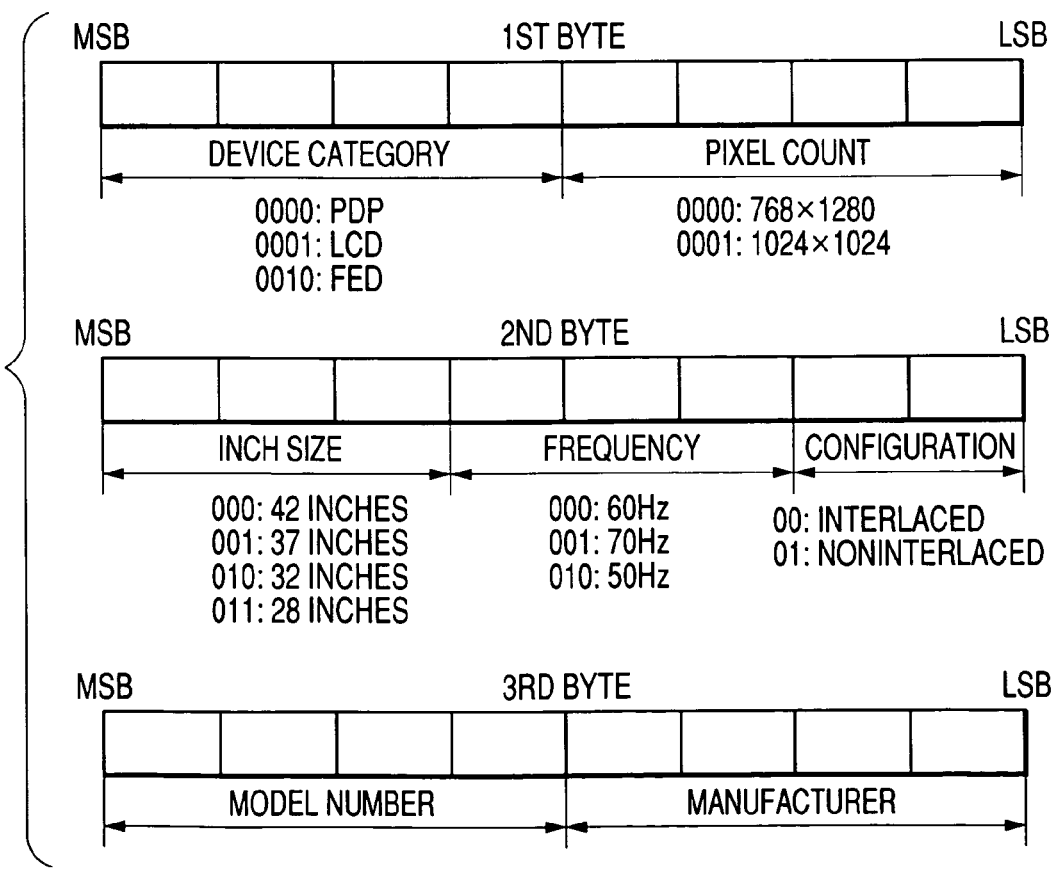
FIGS. 5A and 5B show a concrete example of ID information.

The ID information to be stored in the memory section 255 will now be described in detail. FIGS. 5A and 5B show an example of ID information. As shown in FIG. 5A, the ID information contains a display device type of the display panel 2 (1), a display format (2), a model number (3), and a manufacturer name (4). The display device type (1) contains display device category information, which represents an LCD panel, PDP, FED, or the like, and inch size information, which indicates the panel size. The display format (2) contains a pixel count, refresh frequency, and scanning method (e.g., interlaced or noninterlaced). FIG. 5B shows a typical data structure of ID information. As shown in FIG. 5B, the ID information comprises, for instance, 3-byte serial data. For example, the four high-order bits of the first byte are allocated as the category information for display device type identification, and the following four bits are allocated as the information for indicating the display section pixel count. The three high-order bits of the second byte are allocated as the information for indicating the display section inch size. The following three bits are allocated as the information for indicating the refresh frequency. The remaining two low-order bits are allocated as the information for indicating the scanning method. Finally, the third byte is allocated as the information for indicating the model number and manufacturer name of the display panel 2.

For example, if the four high-order bits of the first byte are "0000", they represent a PDP. If they are "0001", they represent an LCD panel. If they are "0010", they represent an FED. If the four low-order bits of the first byte are "0000", they represent a pixel count of 768×1280. If they are "0001", they represent a pixel count of 1024×1024. The three high-order bits of the second byte indicate the inch size. If they are "000", they represent 42 inches. If they are "001", they represent 37 inches. If they are "010", they represent 32 inches. The following three bits of the second byte indicate the refresh frequency. If they are "000", they indicate 60 Hz. If they are "001", they indicate 70 Hz. If they are "010", they indicate 50 Hz. The two low-order bits of the second byte indicate the scanning method. If they are "00", they indicate an interlaced scanning method. If they are "01", they indicate a noninterlaced scanning method.

The above ID information is transmitted to the first control circuit 110 in the STB 1 via the communication line within the cable 3. The first control circuit 110 receives the transmitted ID information and analyzes it to determine the display device type and display format of the display panel that is connected to the STB 1.

The control operations performed by the first control circuit 110, which vary with the display device type of the display panel, will now be described in detail.

(1) Control of the Backlight Control Circuit 254

The first control circuit 110 analyzes the four high-order bits of the first byte of the ID information. If the display panel 2 connected to the STB 1 is an LCD panel 2A, the first control circuit 110 supplies an APL-based correction control signal to the LCD panel 2A and exercises backlight illuminance control as described earlier. If, on the other hand, the result of the above analysis indicates that the display panel 2 connected to the STB 1 is a PDP 2B, no backlight illuminance control is required. Therefore, the first control circuit 110 stops supplying the APL-based correction control signal for backlight illuminance control to the display panel (PDP 2B in this case) via the communication line within the cable 3. More specifically, backlight illuminance control is not exercised if the PDP 2B is connected to the STB 1 (the backlight illuminance control function is disabled).

(2) Control of the Color Correction Process Circuit 106

Since CRT displays have been conventionally used, chromaticity adjustments are generally made with reference to CRT chromaticity. The LCD panel chromaticity characteristic is substantially the same as the CRT chromaticity characteristic. As is obvious from the xy chromaticity diagrams of an LCD panel and PDP in FIG. 6, however, the PDP chromaticity characteristic is more extensive than the LCD chromaticity characteristic. Therefore, the PDP shows green strongly, renders cyan greenish, and turns yellow to yellowish green. If the ID information analysis result indicates that the display panel 2 connected to the STB 1 is a PDP 2B, the first control circuit 110 supplies a color correction setting for the PDP to the color correction process circuit 106. The setting is appropriate for the PDP color reproduction characteristic (i.e., the setting corrects the color reproduction characteristic peculiar to the PDP) and illustrated in Table 1. When the PDP is connected to the STB 1, a color correction setting is supplied to the color correction process circuit 106 so as to render the PDP chromaticity characteristic close to that of an LCD panel. The supplied color correction setting decreases the luminance of green, turns cyan to light blue by decreasing the luminance of green and increasing the luminance of blue, and renders yellow close to blue by decreasing the luminance of both green and red.

TABLE 1

| Color | LCD | PDP |
|---|---|---|
| Green | — | Decreases the luminance of G. |
| Cyan | — | Decreases the luminance of G. Increases the luminance of B. |
| Yellow | — | Decreases the luminance of R. Decreases the luminance of G. |

It is conceivable that the color correction process circuit 106 may use the following color correction method. The method is to convert a digital video signal to a hue signal and saturation signal, and shift the hue of a signal within one or more hue ranges, which are specified by the first control circuit 110, by a number of levels specified by the first control circuit 110. Alternatively, the saturation for a hue signal within one or more specified hue ranges may be shifted by a number of levels specified by the first control circuit 110. The details of this color correction process are not given herein because they are described by Japanese Patent Laid-open No. 2003-4.7020.

(3) Control of the Gamma Correction Circuit 108

Figure 7:
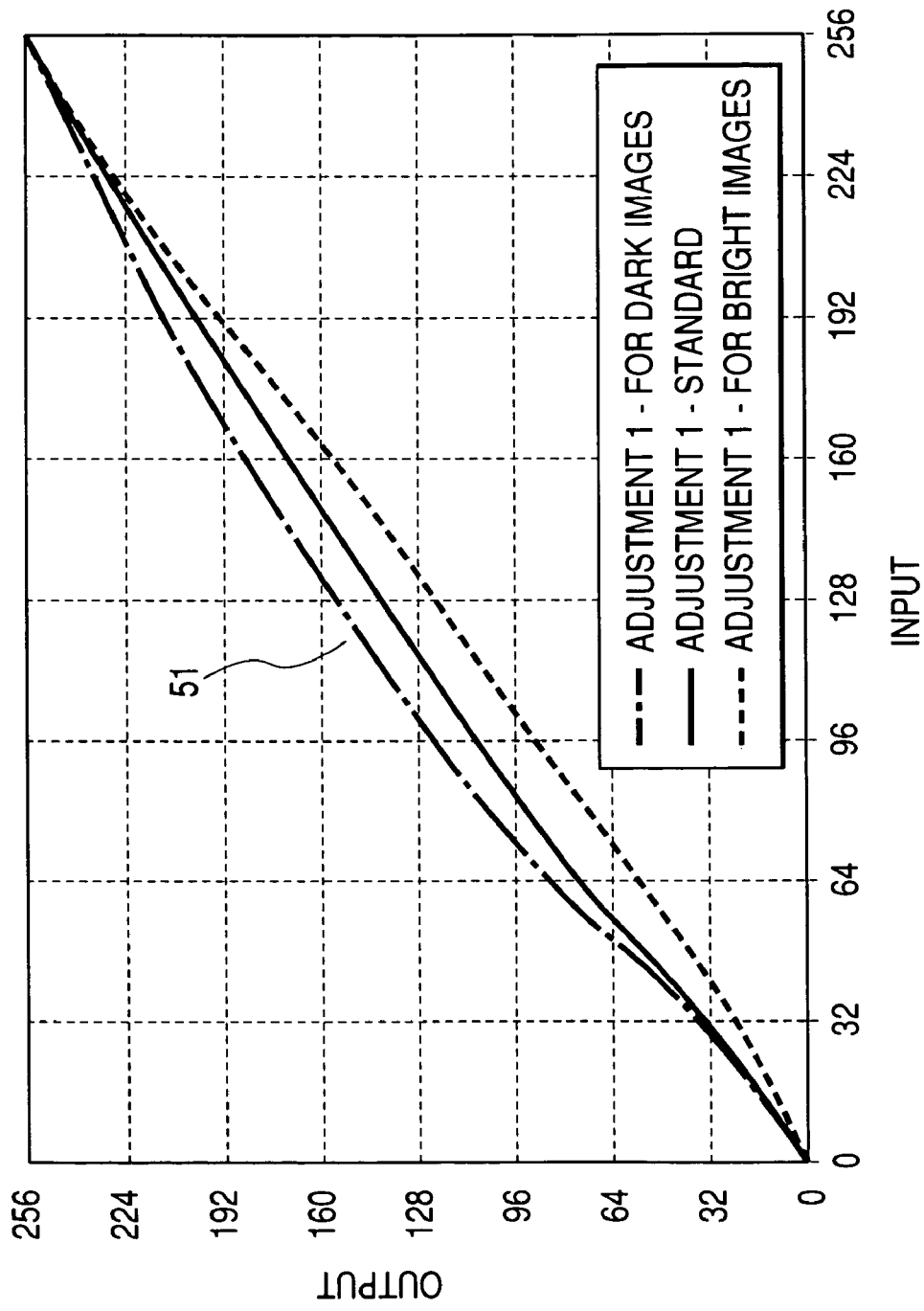
FIG. 7 illustrates a gamma characteristic with reference to an LCD APL.
Figure 8:
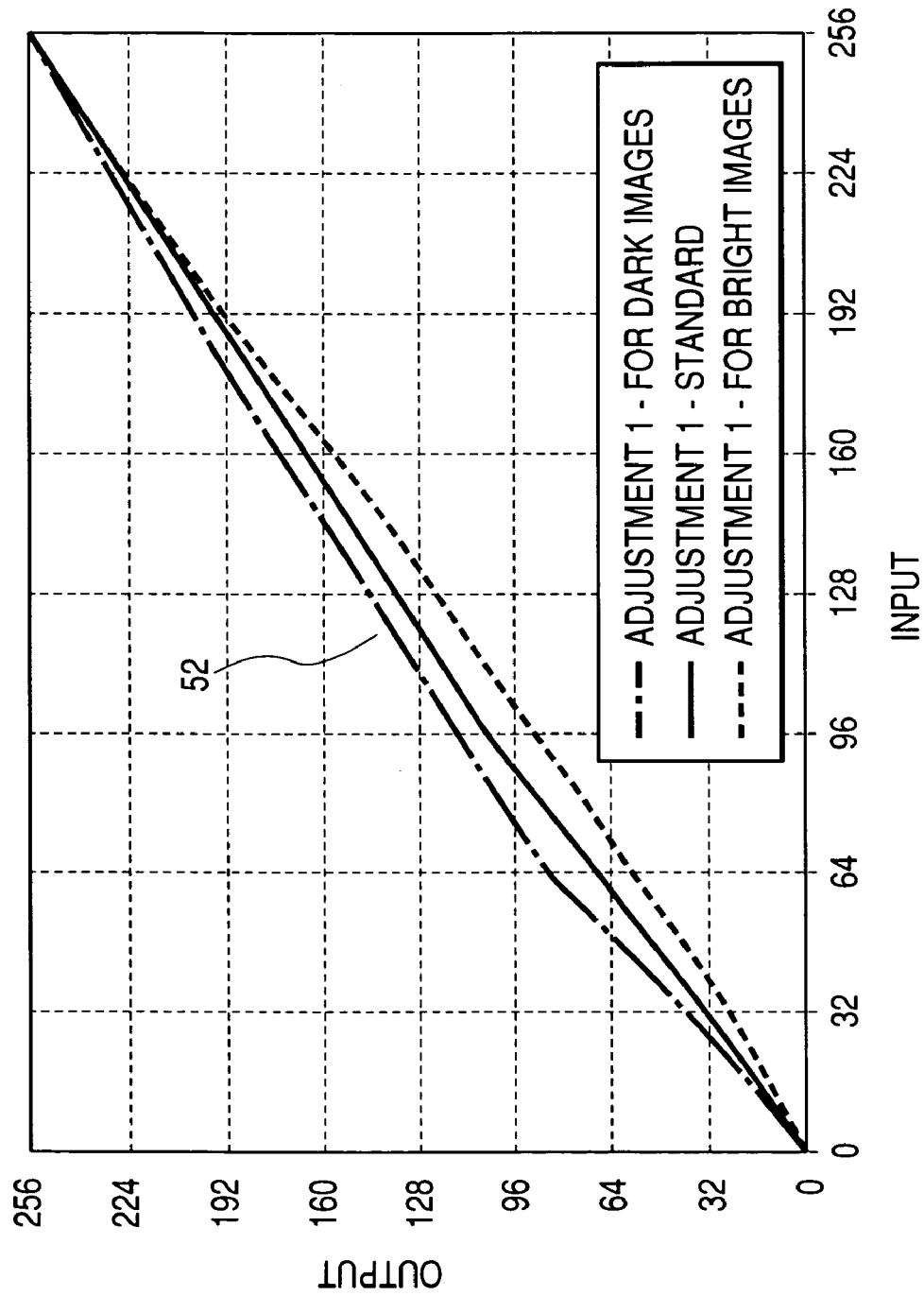
FIG. 8 illustrates a gamma characteristic with reference to a PDP APL.

As exemplified in FIGS. 7 and 8, the gamma correction circuit 108 has a first gamma characteristic 51, which corresponds to the LCD panel, and a second gamma characteristic 52, which corresponds to the PDP. As is obvious from FIGS. 7 and 8, the PDP's deviation from linearity is small from the viewpoint of faithful image reproduction. In the case of the LCD panel, however, a brighter screen is called for. For a dark video signal, therefore, the LCD panel's deviation from linearity is greater than the PDP's deviation. In FIGS. 7 and 8, the horizontal axis represents the input of the gamma correction circuit 108 whereas the vertical axis represents the output of the same circuit.

Both of the first and second gamma characteristics 51, 52 have three types of gamma corrections. The first gamma correction is suitable for a predefined bright scene, that is, a scene having a high APL. The second gamma correction is suitable for a predefined dark scene, that is, a scene having a low APL. The third gamma correction is suitable for a scene that is intermediate between the bright scene and dark scene. In accordance with the result of detection by the signal level detection circuit 104, the first control circuit 110 selects an appropriate type of gamma correction. As indicated in FIGS. 7 and 8, the gamma characteristic employed by the present embodiment is such that the gradient of a great amplitude section is increased to provide the great amplitude section with gradation because the gamma characteristic for a scene having a high APL frequently provides a video signal having a great amplitude, and that the gradient of a small amplitude section is increased to provide the small amplitude section with gradation because the gamma characteristic for a scene having a low APL frequently provides a video signal having a small amplitude.

If the ID information analysis result, which is fed from the display panel 2, indicates that the display panel 2 connected to the STB 1 is an LCD panel 2A, the first control circuit 110 controls the gamma correction circuit 108 in such a manner as to select the first gamma characteristic 51. If, on the other hand, the display panel 2 connected to the STB 1 is a PDP 2B, the first control circuit 110 controls the gamma correction circuit 108 in such a manner as to select the second gamma characteristic 52. In a situation where the display panels differ in gamma characteristic, this control method is effective when the video setup needs to vary with the employed display panel, which is compensated for by a gamma characteristic selected by the gamma correction circuit 108.

It has been assumed that the display panels differ in gamma characteristic. However, the present invention is not limited to a case where the display panels differ in gamma characteristic. The present invention can also be applied to a case where a single, common gamma characteristic is used.

The control operation that is performed by the first control circuit 110 in accordance with the display format of the display panel 2 will now be described in detail. The first control circuit 110 analyzes the four low-order bits of the first byte of the ID information to determine the display format of the connected display panel 2. It is assumed herein that the connected display panel 2 is a PDP 2A. If, for instance, the bit analysis result indicates that the display format of the connected display panel 2 is 768 horizontal pixels×1280 vertical pixels, the first control circuit 110 controls the format conversion circuit 105 in such a manner that the format conversion circuit 105 converts the input video signal (e.g., NTSC signal) to a video signal having 768×1280 pixels. More specifically, the first control circuit 110 sets an interpolation coefficient (magnification ratio) for a horizontal pixel/vertical line interpolation process that is performed by the format conversion circuit 105. If the horizontal/vertical pixel count of the connected display panel 2 is 1024×1024, the first control circuit 110 controls the format conversion circuit 105 in such a manner that the format conversion circuit 105 converts the input video signal (e.g., NTSC signal) to a video signal having 1024×1024 pixels.

Table 2 lists typical commands that are issued between the STB 1 and display panel 2 via the cable 3.

TABLE 2

| No. | Designation | Function | Direction of data transmission | PDP | LCD |
|---|---|---|---|---|---|
| 1 | POWER | Power ON/OFF | Bidirectional communication | ○ | ○ |
| 2 | VOLUME/MUTE | Volume/mute adjustment | STB → Display panel | ○ | ○ |
| 3 | BASS | Bass adjustment | STB → Display panel | ○ | ○ |
| 4 | TREBLE | Treble adjustment | STB → Display panel | ○ | ○ |
| 5 | BALANCE | Balance adjustment | STB → Display panel | ○ | ○ |
| 6 | SURROUND | Surround adjustment | STB → Display panel | ○ | ○ |
| 7 | CONTRAST (PDP) | Panel contrast adjustment | STB → Display panel | ○ | X |
| 8 | PANEL_ID | Panel ID verification | Bidirectional communication | ○ | ○ |
| 9 | PDP_MODE_ON/OFF | Motion picture mode adjustment (motion picture video setup) | STB → Display panel | ○ | X |
| 10 | BLACK_INSERT (LCD) | Black insertion ON/OFF | STB → Display panel | X | ○ |
| 11 | CONTRAST/ BACKLIGHT (LCD) | Panel contrast/backlight adjustment | STB → Display panel | X | ○ |

In Table 2, the marks in the "PDP" and "LCD" columns indicate whether the commands are used by the display panels. More specifically, commands marked "o" are used by a specific display panel, whereas commands marked "x" are not used by a specific display panel. "POWER" is a command that indicates main power ON/OFF. This command is transmitted from a side on which a main power ON procedure is performed (upon remote control signal reception or operating control key activation). If, for instance, the power-ON procedure is performed by the STB 1, the first control circuit 110 selects a "setup command" as the command type and sends the "POWER" command to the display panel 2 to turn ON the display panel main power. If, on the other hand, the power-ON procedure is performed by the display panel 2, the main power for the display panel, which is a slave, does not turn ON, but the "POWER" command is transmitted to the STB with a "response command" selected as the command type to notify that the main power ON procedure is performed. When the STB, which is a master, receives the command, the "POWER" command is transmitted to the STB with a "setup command" selected as the command type. As a result, the main power for the display panel 2 turns ON. The "POWER" command is a toggle command. If the "POWER" command is received while the main power is ON, the main power turns OFF.

The "VOLUME/MUTE" command issues a volume adjustment/audio mute instruction. The "BASS" and "TREBLE" commands issue an audio tone quality adjustment instruction. The "BALANCE" command issues a left/right audio balance adjustment instruction. The "SURROUND" command issues an acoustic field correction instruction. These commands are transmitted from the STB 1 to the display panel.

The "CONTRAST (PDP)" command provides PDP panel contrast adjustments. The "CONTRAST/BACKLIGHT (LCD)" command provides LCD panel contrast adjustments and backlight adjustments. The panel contrast is adjusted by the second control circuit 210/310 in the LCD display section 252/PDP display section 352 within the display panel when the "CONTRAST/BACKLIGHT (LCD)" command is received. The "BLACK_INSERT (LCD)" command issues a black insertion ON/OFF instruction in order to improve the motion picture response performance of the LCD panel. The "PDP_MODE_ON/OFF" command turns ON/OFF the PDP mode for reducing the degree of motion picture pseudo-contour interference.

The "PANEL_ID" command provides ID information exchange between the STB and display panel. The first control circuit 110 of the STB 1 checks the voltage at the panel connection verification input terminal T1 to verify the panel connection, and then transmits a "query command" ("0010"), which indicates a previously mentioned command type, and the "PANEL_ID" command, which is an ID information request, to the display panel 2. In response to the ID information request, the second control circuit 210 of the display panel 2 reads ID information data from the memory section 255 and returns a "response command" ("0001"), which indicates a command type, the "PANEL_ID" command, and the read ID information data to the STB 1.

Figure 9A:
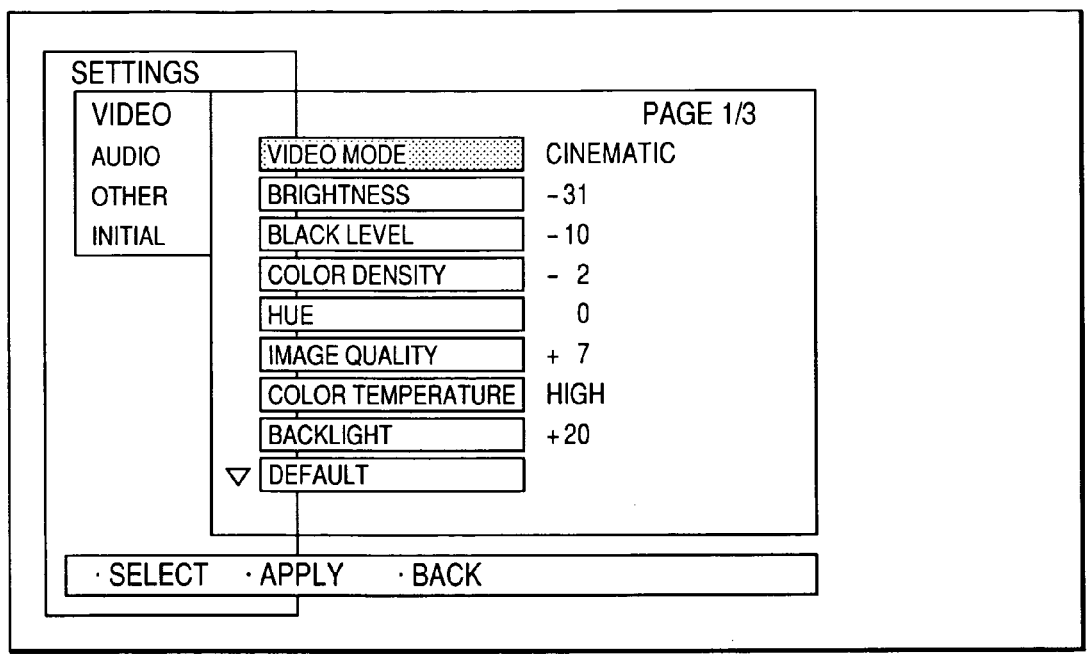
FIGS. 9A and 9B show an example of a menu screen, which is used to enter various settings.
Figure 9B:
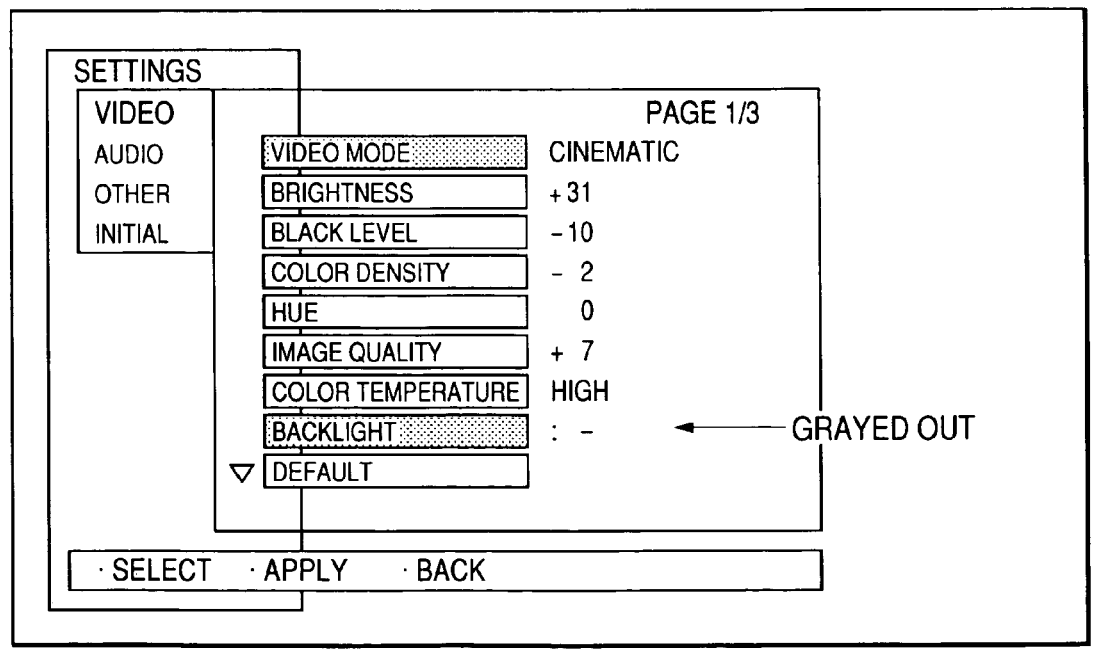

FIGS. 9A and 9B show an example of a menu screen, which is one of various OSD screens displayed on the display panel 2 and used to enter various settings. FIG. 9A shows a selection screen for LCD video setup. FIG. 9B shows a selection screen for PDP video setup. When an LCD panel is connected to the STB 1, backlight illuminance control is exercised. Therefore, the backlight brightness (e.g., backlight illuminance (reference illuminance) prevailing when the APL is at an intermediate value (APL1 to APL3)) is user-definable as indicated in FIG. 9A. Meanwhile, backlight illuminance control is not exercised for the PDP. Therefore, the "Backlight" field is grayed out as indicated in FIG. 9B so that the backlight reference illuminance cannot be set. In this manner, the common selectable options are provided for the display panels while unavailable (inapplicable) options are grayed out to indicate available options. This makes it possible to use a common menu screen, minimize the memory capacity requirements, and reduce the cost. It goes without saying that irrelevant options may be hidden depending on the employed display panel. As described earlier, the OSD information about the menu screen and the like is subjected to superposition by the first control circuit 110 within the OSD circuit 112 of the STB 1.

In the embodiment described above, illuminance control of the backlight 253 for the LCD panel 2A is exercised in such a manner that the first control circuit 104 generates a correction control signal in accordance with APL information and transmits the generated signal to the second control circuit 210 of the LCD panel 2A, and that the second control circuit 210 generates an interpolation correction control signal in accordance with the correction control signal and supplies the generated signal to the backlight control circuit 254. However, the following alternative configuration may be employed.

In the alternative configuration, the STB 1 generates signals up to and including the interpolation correction control signal in accordance with the APL information, whereas the second control circuit of the LCD panel 2A merely exercises communication functions (and overall control of the LCD panel) Further, the backlight control circuit 254 is controlled via the second control circuit to exercise illuminance control of the backlight 253. In this instance, the first control circuit of the STB 1 generates signals up to and including the interpolation correction control signal in accordance with the APL information. If such signal generation is difficult, a communication microcomputer, which is capable of communicating with the display panel, may be furnished in addition to the first control circuit and used to generate signals up to and including the interpolation correction control signal in accordance with the APL information. In this instance, the cost increases because the added communication microcomputer is provided for the STB side; however, the burden on the LCD panel 2A and its cost will decrease.

In the embodiment described above, the panel connection is verified by checking that the panel connection verification input terminal T1 is High. However, the present invention is not limited to such panel connection verification. For example, it may be alternatively assumed that the signal appearing at the panel connection verification input terminal T1 is Low when the display panel 2 is connected to the STB 1, and the panel connection may be verified by detecting such a Low signal. More specifically, the panel connection verification input terminal T1 on the STB 1 is pulled up to a power supply through a resistor, and a transistor or other similar switch circuit is connected to a terminal (Ta) that is mounted on the second connector (the reference numeral is 209 for the LCD panel) and is to be connected to the panel connection verification input terminal T1. When the power cord of (not shown) the display panel 2 is connected to a power source and the standby power supply starts up to invoke the standby state, the second control circuit (the reference numeral is 210 for the LCD panel) controls the transistor so that the second connector terminal (Ta) (the reference numeral is 209 for the LCD panel) is placed at a ground potential. This allows the first control circuit 110 to verify the panel connection by checking whether a Low-level signal appears at the panel connection verification input terminal T1.

As described above, the present embodiment enables the STB 1 to operate in coordination with both the LCD panel and PDP panel. In other words, the STB 1 is compatible with both the LCD panel and PDP panel. Therefore, the STB 1 can be used in conjunction with the display panel 2 no matter what type of display device is employed. Thus, any combination of the STB 1 and display panel 2 is acceptable. This permits the user to choose from a wide variety of display panels, and provides increased user-friendliness. Further, if the user wants to view an image displayed by the PDP 2B after purchasing a display system comprising the STB 1 and LCD panel 2A, the user simply has to purchase the PDP 2B so that the economic burden on the user is minimized. When the user owns two types of display panels, increased user-friendliness is provided because the user can use a display panel whose image quality is better suited for the employed video source.

The foregoing embodiment of the present invention has been described with reference to an example in which the STB 1 and display panel 2 are connected via the cable 3. However, the present invention can also be applied to a case where the STB 1 and display panel 2 are connected via a wireless electrical link (so that a video signal is wirelessly transmitted from the STB 1 to the display panel 2).

What is claimed is:

1. A display system comprising:
   a display panel;
   a signal processing apparatus that is connected to the display panel in a detachable manner, processes an externally input video signal, and supplies the processed video signal to the display panel; and
   an OSD circuit provided in the display panel or the signal processing apparatus, the OSD circuit generating a signal for displaying a common menu screen, the common menu screen being provided with common selectable options for the display panel to allow a user to set screen conditions of the display panel including a backlight's reference illuminance;
   wherein the display panel includes a memory section for storing ID information, which includes the information about the type of a device constituting the display panel, and a transmitter section for transmitting the ID information stored in the memory section to the signal processing apparatus; and
   wherein the signal processing apparatus includes a control circuit that receives the ID information transmitted from the display panel, determines the type of a device constituting the display panel from the received ID information, and transmits a control signal to the display panel in accordance with the determination result; and
   wherein the control circuit, in case the ID information received indicates that the display panel to which the signal processing apparatus is connected is an LCD panel, transmits the control signal for exercising illuminance control of a backlight of the LCD panel to the LCD panel, controls so as to generate the signal of the common menu screen, the common menu screen being provided with the common selectable options for the display panel and enabling setting of the common selectable options including an option to allow the user to set a backlight's condition of the LCD panel, and makes the LCD panel display the common menu screen, and in case the ID information indicates that the display panel to which the signal processing apparatus is connected is a display panel except an LCD panel, ceases transmitting the control signal for exercising illuminance control of the backlight, controls so as to generate the signal of the common menu screen, the common menu screen being provided with the common selectable options for the display panel and disabling by graying out, setting of the option to allow the user to set the backlight's condition of the LCD panel while enabling setting of other common selectable options, and makes other display panel except the LCD panel display the common menu screen.

2. The display system according to claim 1, wherein the display panel except an LCD panel is a plasma display panel or a field emission display panel.

3. The display system according to claim 1, wherein the signal processing apparatus includes a color correction circuit for performing a color correction process on the video signal, and wherein the color correction process performed by the color correction circuit varies with the device type of the display panel connected, which is determined from the ID information received.

4. The display system according to claim 3, wherein the control circuit has a first setting, which provides a color correction process for an LCD panel, and a second setting, which provides a color correction process for a plasma display panel, supplies the first setting to the color correction circuit if the ID information received indicates that the connected display panel is an LCD panel, and supplies the second setting to the color correction circuit if the ID information received indicates that the connected display panel is a plasma display panel.

5. The display system according to claim 1, wherein the signal processing apparatus includes a gamma correction circuit for performing gamma correction on the video signal, and wherein the control circuit changes the gamma correction characteristic of the gamma correction circuit in accordance with the device type of the display panel connected.

6. The display system according to claim 1, wherein the first control circuit verifies that the display panel is connected to the signal processing apparatus, and then transmits an ID information request command to the display panel to request the transmission of the ID information.

7. The display system according to claim 1, wherein the transmitter section reads the ID information stored in the memory section and transmits the read ID information to the signal processing apparatus in response to the ID information request command.

8. The display system according to claim 1, wherein the ID information includes the information about the horizontal pixel count and vertical line count of the display panel as the information about the specifications for the display panel, wherein the signal processing apparatus comprises a format conversion circuit for converting the horizontal dot count and vertical line count of the video signal, and wherein the control circuit determines the horizontal pixel count and vertical line count of a connected display panel from the ID information received, and controls the format conversion circuit to ensure that the horizontal dot count and vertical line count of the video signal agree with the horizontal pixel count and vertical line count of the connected display panel.

9. The display system according to claim 1, wherein the ID information further includes the information about the model number, serial number, and manufacturer of the display panel.

10. The display system according to claim 1, wherein the video signal input into the signal processing apparatus is an analog television signal or a digital television signal, and wherein the signal processing apparatus further includes a tuner for receiving the analog television signal and digital television signal.

11. A signal processing apparatus connected to a display panel in a detachable manner, processes an input video signal, and outputs the processed video signal to the display panel, the signal processing apparatus comprising:
    a receiver section for receiving ID information, which includes the information about the type of a device constituting the display panel;
    a control circuit for determining the device type of the display panel from the ID information received by the receiver section, and controlling the operation of the signal processing apparatus in accordance with the determination result; and
    an OSD circuit for generating a signal for displaying a common menu screen, the common menu screen being provided with common selectable options for the display panel to allow a user to set screen conditions of the display panel including a backlight's reference illuminance;

wherein the control circuit, in case the ID information received indicates that the display panel to which the signal processing apparatus is connected is an LCD panel, transmits a control signal for exercising illuminance control of a backlight of the LCD panel to the LCD panel, controls so as to generate the signal of the common menu screen, the common menu screen enabling setting of the common selectable options including an option to allow the user to set a backlight's condition of the LCD panel, and makes the LCD panel display the common menu screen, and in case the ID information indicates that the display panel to which the signal processing apparatus is connected is a display panel except an LCD panel, ceases transmitting the control signal for exercising illuminance control of the backlight, controls so as to generate the signal of the common menu screen, the common menu screen being provided with the common selectable options for the display panel and disabling by graying out, setting of the option to allow the user to set the backlight's condition of the LCD panel while enabling setting of other common selectable options, and makes other display panel except the LCD panel display the common menu screen.

12. The signal processing apparatus according to claim 11, wherein said display panel except an LCD panel is a plasma display panel or a field emission display panel.

13. The signal processing apparatus according to claim 11, wherein, when the connection between the signal processing apparatus and the display panel is verified, the control circuit transmits a command to the display panel to request the display panel to transmit the ID information.

* * * * *